DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

Published March 16, 1971

884 O.G. 733

T884,015

COPOLYCARBONATE BINDERS FOR USE IN ELECTROPHOTOGRAPHIC ELEMENTS

William J. Staudenmayer, Pittsford, and Stewart H. Merrill, Rochester, N.Y. (both of Kodak Park Works, Rochester, N.Y. 14650)

Filed June 1, 1970, Ser. No. 42,523
**Int. Cl. G03g *5/00***
U.S. Cl. 96—1.5
No Drawing. 54 Pages Specification

Photoconductive layers containing certain copolycarbonates as binders exhibit improved resistance to liquid developer attack. As a result, their lifetime is extended when utilized in xerographic liquid development processes.

Useful binders are copolycarbonates having repeating units of (I) 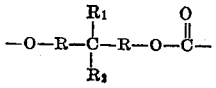

and (II) 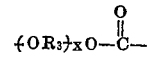

wherein R is an arylene radical including a substituted arylene radical; $R_1$ is (1) an aliphatic radical having 1 to 8 carbon atoms, (2) an aryl radical, (3) when joined with the adjacent arylene group, the carbon atoms necessary to complete a fused ring moiety, (4) when joined with $R_2$, the carbon atoms necessary to complete a monocycloalkylidene nucleus, (5) when joined with $R_2$, the carbon atoms necessary to complete a bridged cycloalkylidene group and (6) a cycloalkyl radical, all of (1) through (6) including substituted counterparts; $R_2$ represents a hydrogen atom or any of the substituents set forth for $R_1$; $R_3$ represents a lower alkylene group having 2 to 8 carbon atoms; and $x$ is an integer such that the molecular weight of the group $\{OR_3\}_x$ is about 12 to about 6500. These copolycarbonates generally contain from about 2 to about 98% of repeating unit I and these binders can be either random or block copolymers.